US011242899B2

(12) United States Patent
Billmaier et al.

(10) Patent No.: US 11,242,899 B2
(45) Date of Patent: Feb. 8, 2022

(54) FLUID DISTRIBUTION APPARATUS AND THE AXLE ASSEMBLY MADE THEREWITH

(71) Applicant: Dana Automotive Systems Group, LLC, Maumee, OH (US)

(72) Inventors: Nicholas C. Billmaier, Bowling Green, OH (US); Thomas L. Nahrwold, Napoleon, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 88 days.

(21) Appl. No.: 16/430,836

(22) Filed: Jun. 4, 2019

(65) Prior Publication Data

US 2019/0376564 A1 Dec. 12, 2019

Related U.S. Application Data

(60) Provisional application No. 62/681,450, filed on Jun. 6, 2018.

(51) Int. Cl.
| | |
|---|---|
| *F16D 13/74* | (2006.01) |
| *B60K 17/16* | (2006.01) |
| *F16D 33/08* | (2006.01) |
| *F16H 41/30* | (2006.01) |
| *B60K 17/02* | (2006.01) |

(52) U.S. Cl.
CPC .............. *F16D 13/74* (2013.01); *B60K 17/02* (2013.01); *F16D 33/08* (2013.01); *F16H 41/30* (2013.01); *B60K 17/16* (2013.01)

(58) Field of Classification Search
CPC ....... B60K 17/16; F16D 13/385; F16D 13/74; F16D 13/644
See application file for complete search history.

(56) References Cited

U.S. PATENT DOCUMENTS

| | | | |
|---|---|---|---|
| 3,552,534 A | 1/1971 | Kern | |
| 4,231,266 A | 11/1980 | Nishikawa | |
| 4,930,601 A | 6/1990 | Leidecker | |
| 5,687,826 A | 11/1997 | Kinoshita | |
| 5,699,877 A | 12/1997 | Dreier | |
| 6,547,686 B1 | 4/2003 | Thorenz | |
| 7,980,983 B2 * | 7/2011 | Schrand | F16H 48/34 |
| | | | 475/231 |
| 8,672,114 B2 | 3/2014 | Davis | |
| 8,689,567 B2 | 4/2014 | Norem | |
| 8,708,105 B2 | 4/2014 | Sowul | |
| 8,939,269 B2 | 1/2015 | Chavdar | |
| 9,163,715 B2 * | 10/2015 | Valente | F16H 57/0427 |
| 2009/0270217 A1 * | 10/2009 | Zohrer | F16H 48/22 |
| | | | 475/225 |
| 2015/0280522 A1 | 10/2015 | Austin | |
| 2016/0377168 A1 * | 12/2016 | Nahrwold | F16H 57/037 |
| | | | 475/160 |
| 2017/0108055 A1 * | 4/2017 | Later | F16D 13/72 |

* cited by examiner

*Primary Examiner* — Charles A Fox
*Assistant Examiner* — Jessica L Burkman
(74) *Attorney, Agent, or Firm* — Marshall & Melhorn, LLC

(57) ABSTRACT

A fluid distribution apparatus for an axle assembly, the fluid distribution apparatus including a cylindrical portion rotatably disposed about a bearing race. A conical portion is coupled with the cylindrical portion, and a retaining portion is coupled with the conical portion. A plurality of circumferentially spaced tubes are coupled with the retaining portion, wherein the tubes are at least partially disposed through a rotating component of a clutch.

12 Claims, 8 Drawing Sheets

FLUID DISTRIBUTION APPARATUS AND THE AXLE ASSEMBLY MADE THEREWITH

RELATED APPLICATIONS

The present application claims the benefit of U.S. Provisional Patent Application No. 62/681,450 filed on Jun. 6, 2018, which is fully incorporated by reference herein.

FIELD

The presently disclosed subject matter relates to an axle assembly, and more particularly to a fluid distribution apparatus for an axle assembly.

BACKGROUND

The present subject matter relates to fluid distribution in a drive unit assembly. An axle assembly drive unit assembly may include one or more clutch assemblies to transmit drive force. Insufficient fluid flow in a drive unit assembly may cause thermal failure in a drive unit clutch assembly and other drive unit components.

It would be desirable to produce a drive unit assembly having increased fluid distribution efficacy.

SUMMARY

In concordance and agreement with the present disclosure, a fluid distribution apparatus for an axle assembly, which enhances fluid distribution efficiency of a drive unit assembly, has surprisingly been discovered.

In one embodiment, a fluid distribution apparatus, comprises: a main body; a conical neck portion coupled with the main body; and a retaining portion coupled with the conical neck portion, wherein the retaining portion includes at least one tube coupled thereto, the at least one tube configured to receive a fluid therethrough.

As aspects of certain embodiments, the main body is configured to be disposed about a bearing.

As aspects of certain embodiments, the at least one tube is at least partially disposed through a rotating component of a clutch.

As aspects of certain embodiments, the at least one tube includes a locking element disposed thereon.

As aspects of certain embodiments, the locking element abuts a first surface of the rotating component of the clutch.

As aspects of certain embodiments, a surface of the retaining portion abuts a second surface of the rotating component of the clutch opposite the first surface thereof.

As aspects of certain embodiments, a portion of an inner surface of the at least one tube is substantially continuous with an inner surface of the retaining portion.

In another embodiment, a clutch assembly, comprises: a clutch drum; at least one clutch hub at least partially disposed within the clutch drum; a plurality of first clutch plates movably coupled with a portion of the clutch drum; at least one bearing disposed adjacent at least one of the clutch drum and the at least one clutch hub; and a fluid distribution apparatus configured to permit fluid communication between the bearing and the first clutch plates.

As aspects of certain embodiments, the clutch assembly further comprises a bearing retainer plate disposed adjacent the at least one clutch hub.

As aspects of certain embodiments, the fluid distribution apparatus is rotatable with at least one of the clutch drum and the bearing retainer plate.

As aspects of certain embodiments, a plurality of apertures is formed in at least one of the clutch drum and the bearing retainer plate.

As aspects of certain embodiments, a portion of the fluid distribution apparatus is disposed through the apertures formed in the at least one of the clutch drum and the bearing retainer plate.

As aspects of certain embodiments, at least one of the clutch drum and the clutch hub is formed by a center portion, a wall portion coupled with the center portion, and cylindrical portion coupled with the wall portion.

In yet another embodiment, an axle assembly, comprises: a clutch drum including a center portion, a wall portion coupled to the center portion, and a cylindrical portion coupled to the wall portion, wherein a plurality of first apertures is formed in the clutch drum; a first clutch hub at least partially disposed within the clutch drum about a first shaft; a second clutch hub at least partially disposed within the clutch drum about a second shaft; a first bearing disposed adjacent the first clutch hub about the first shaft; a second bearing disposed adjacent the second clutch hub about the second shaft; a bearing retainer plate disposed adjacent at least one of the first bearing and the first clutch hub, wherein a plurality of second apertures is formed in the bearing retainer plate; a first clutch pack at least partially disposed between the first clutch hub and the clutch drum; a second clutch pack at least partially disposed between the second clutch hub and the clutch drum; and a first fluid distribution apparatus disposed between one of the bearings and one of the clutch packs, wherein the first fluid distribution apparatus is configured to permit fluid communication between the one bearings and the one of the clutch packs.

As aspects of certain embodiments, the axle assembly further comprises a second fluid distribution apparatus disposed between another one of the bearings and another one of the clutch packs, wherein the second fluid distribution apparatus is configured to permit fluid communication between the another one of the bearings and the another one of the clutch packs.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION

Figure 1:
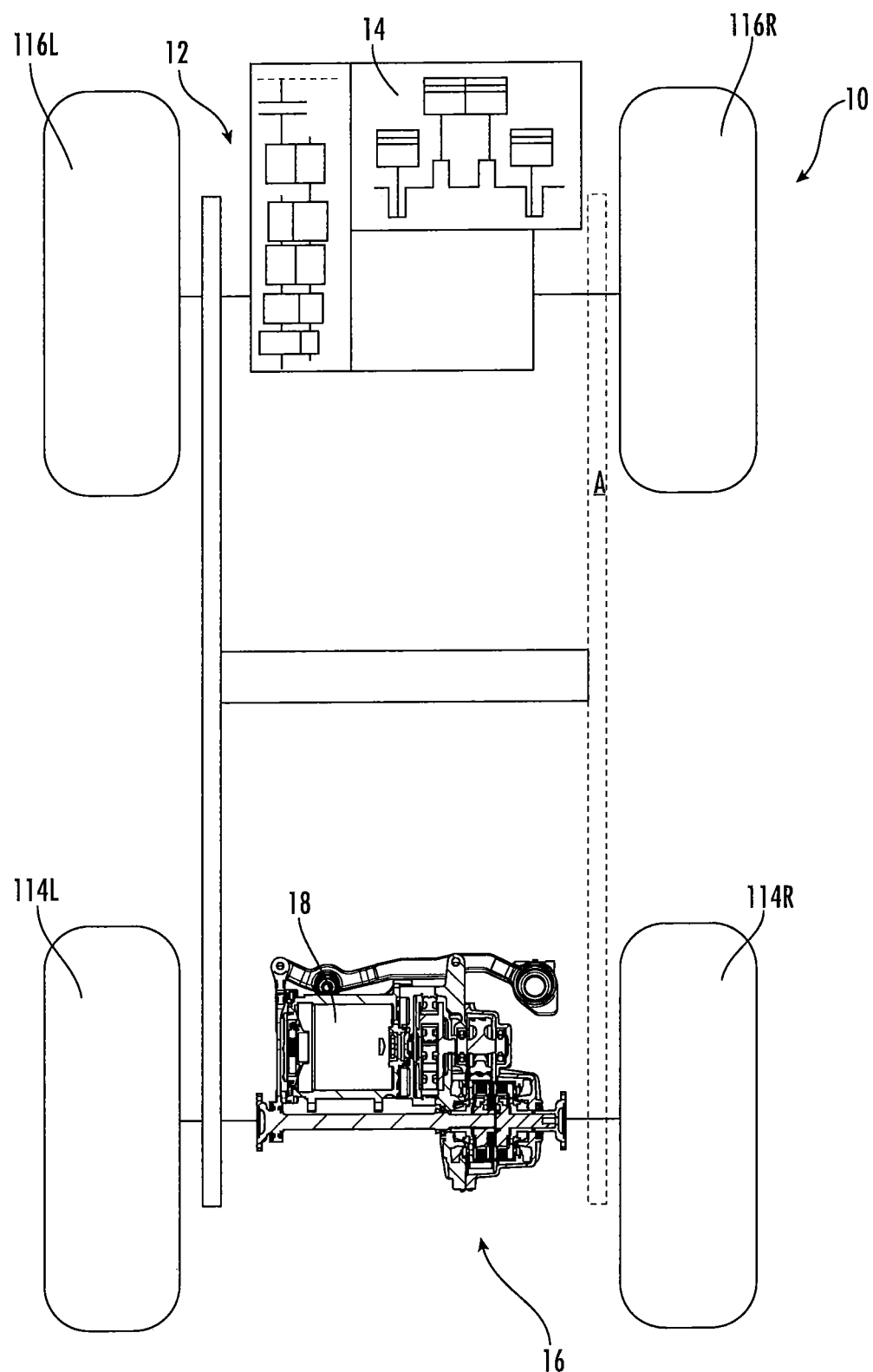
FIG. 1 is a schematic diagram of a vehicle according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, a vehicle constructed in accordance with the teachings of the present disclosure is generally indicated by reference numeral 10. In an embodiment, the vehicle 10 may be a hybrid-electric all-wheel-drive vehicle, where a first axle assembly 12 is driven by an internal combustion engine 14, and a second axle assembly 16 is driven by an electric motor/generator 18. The first axle assembly 12 may transmit torque from the power source 14 to a pair of front wheels 116L, 116R. The second axle assembly 16 may selectively transmit torque from the electric motor/generator 18 to a pair of rear wheels 114L, 114R.

In another embodiment, not depicted, the second axle assembly 16 is utilized with a pure electric vehicle where the second axle assembly 16 is the only driving axle. In still other embodiments, not depicted, the second axle assembly 16 is utilized in a hybrid electric commercial vehicle comprising a tandem axle in which the front tandem axle is driven by an internal combustion engine, and the rear tandem axle is the second axle assembly 16 (or vice versa). The second axle assembly 16 may have applications in commercial vehicles, both light duty and heavy-duty vehicles, and for passenger, off-highway, and sport utility vehicles. Additionally, the second axle assembly 16 described herein may be adapted for use in front and/or rear driving axles, and in steerable and non-steerable axles. It would be understood by one of ordinary skill in the art that the second axle assembly 16 also has industrial, locomotive, military, agricultural, and aerospace applications.

Figure 1A:
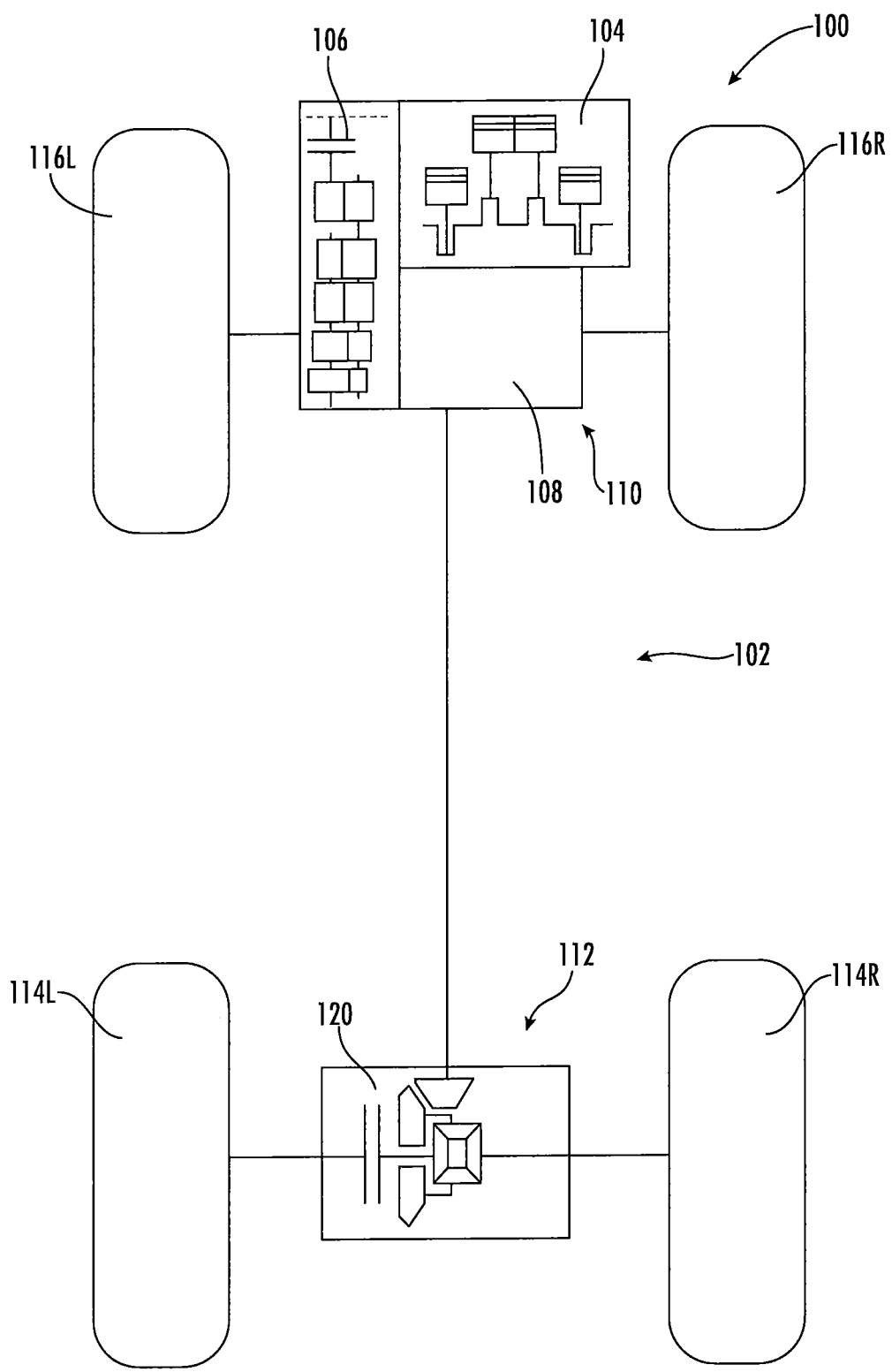
FIG. 1A is a schematic diagram of a vehicle according to another embodiment of the presently disclosed subject matter.

As illustrated in FIG. 1A, another vehicle constructed in accordance with the teachings of the present disclosure is generally indicated by reference numeral 100. The vehicle 100 may comprise a hybrid-electric powertrain 102 having all-wheel drive functionality. The powertrain 102 may include a power source 104 having an output driveably connected with a transmission 106. The power source 104 may be, but is not limited to, an internal combustion engine or an electric motor. The powertrain 102 may include a first axle assembly 110 and a second axle assembly 112. In one embodiment, as illustrated in FIG. 1A, the first axle assembly 110 comprises a power transfer unit 108 driveably connected with an output of the transmission 106. The first axle assembly 110 is driveably connected with the transmission 106 and may continuously transmit torque from the power source 104 to a pair of front wheels 116L, 116R. The second axle assembly 112 may selectively transmit torque from the power source 104 to a pair of rear wheels 114L, 114R via the power transfer unit 108. The second axle assembly 112 may include a drive unit assembly 120.

Figure 2:
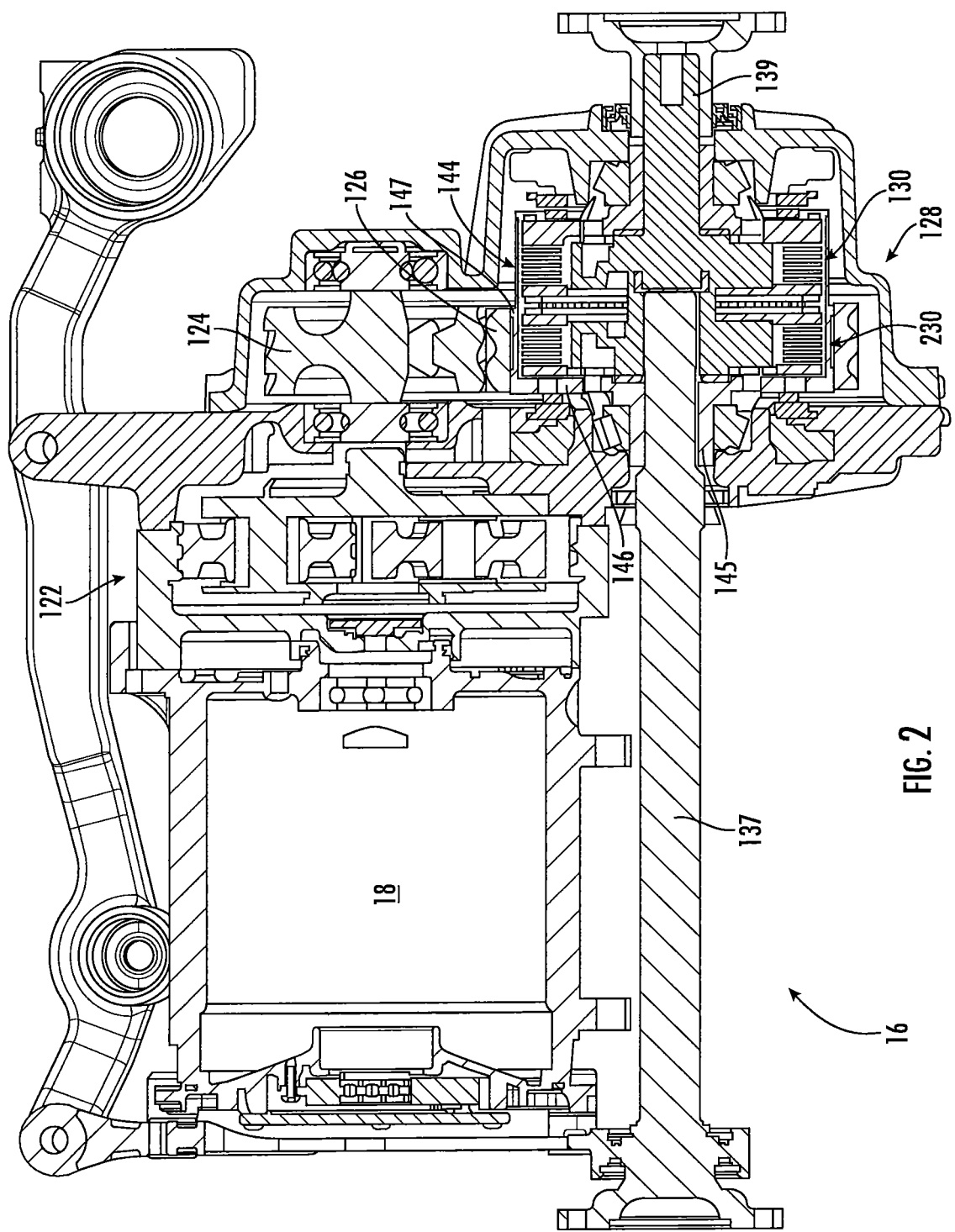
FIG. 2 is a cross-sectional view of an axle assembly including a fluid distribution apparatus according to an embodiment of the presently disclosed subject matter which can be employed in the vehicles shown in FIGS. 1 and 1A.

As illustrated in FIG. 2, in an embodiment, the second axle assembly 16 includes the electric motor/generator 18 providing torque to a planetary gear assembly 122. The planetary gear assembly 122 outputs torque to a first gear 124. In an embodiment, the first gear 124 may be a helical gear. The first gear 124 may be in meshed engagement with a second gear 126. In an embodiment, the second gear 126 may be a helical ring gear. The second gear 126 transmits torque to a differential mechanism 128. In an embodiment, as illustrated in FIG. 2, the differential mechanism 128 may comprise a dual-clutch differential mechanism. The second gear 126 is coupled with a clutch drum 144 (described in additional detail intra) of the differential mechanism 128. The second gear 126 may be coupled with the clutch drum 144 via welding, an interference fit, or spline engagement, but is not limited to these methods of coupling.

Figure 3:
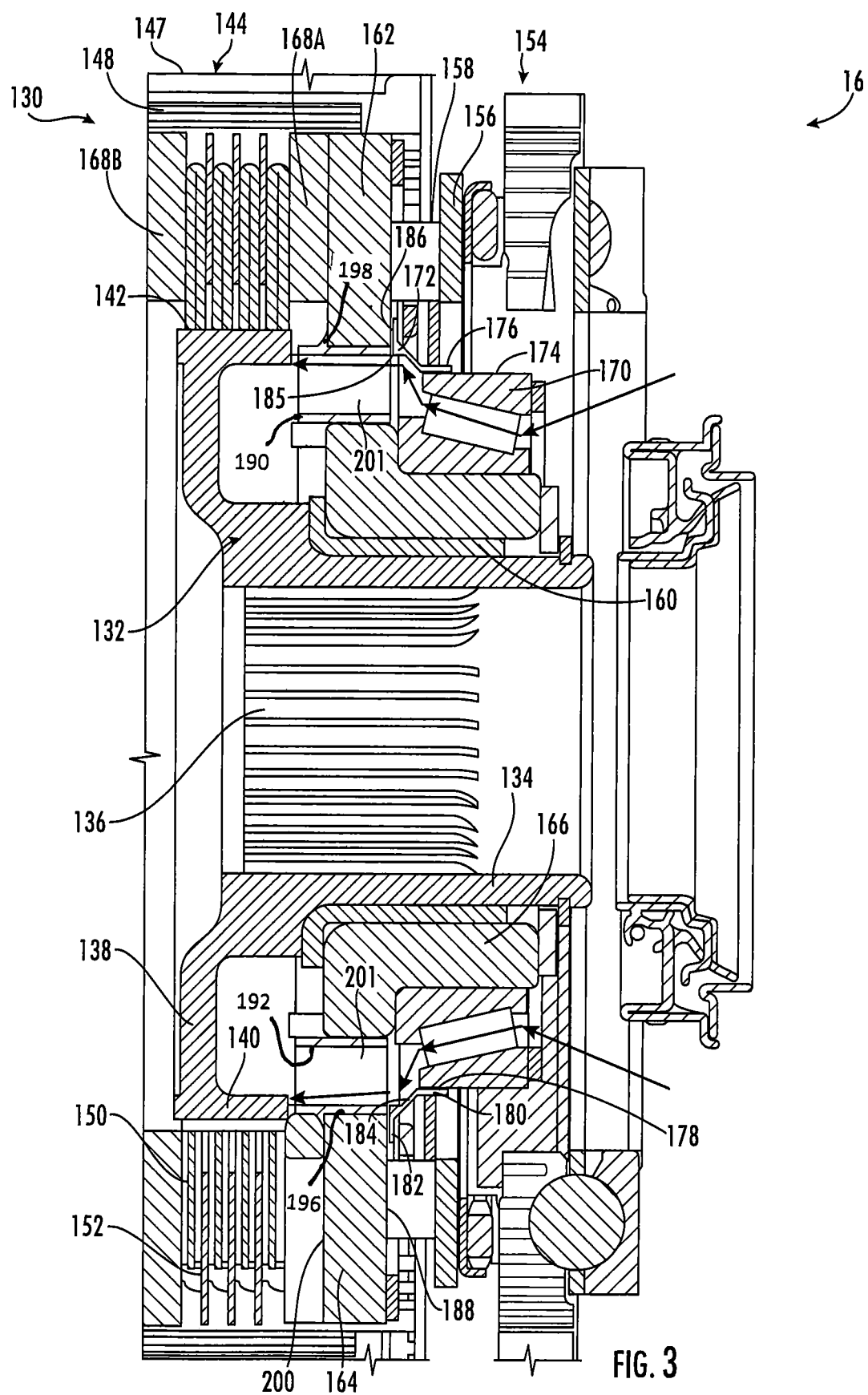
FIG. 3 is an enlarged fragmentary sectional view of a portion of the axle assembly of FIG. 2.
Figure 4:
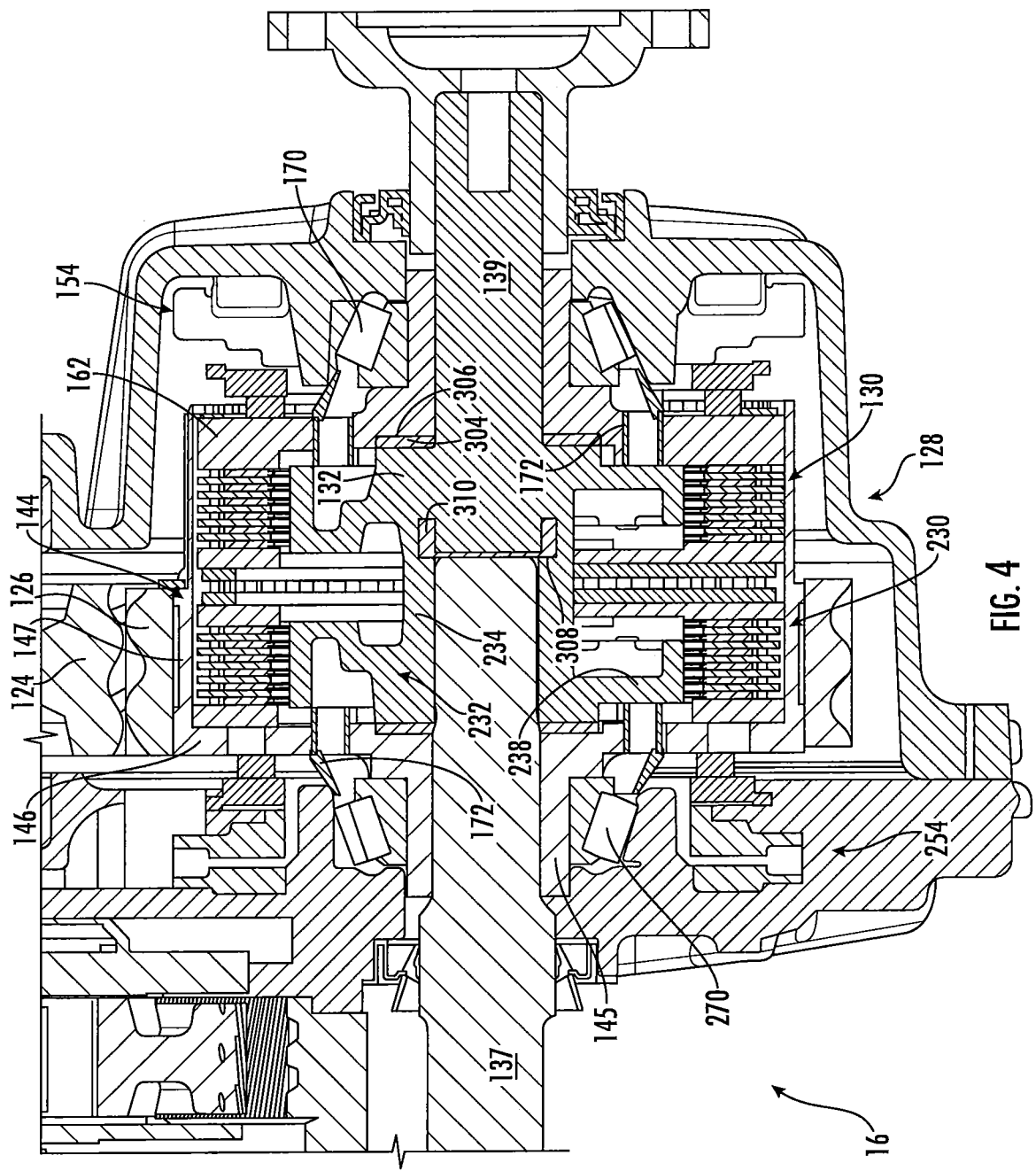
FIG. 4 is an enlarged fragmentary sectional view of a portion of the axle assembly of FIG. 2.

In an embodiment, as illustrated in FIGS. 2-5, the differential mechanism 128 may comprise a first wet clutch assembly 130 and a second wet clutch assembly 230. The first wet clutch assembly 130 may comprise a clutch hub 132. As illustrated in FIG. 3, the clutch hub 132 may comprise an axially extending generally cylindrical center portion 134 having a splined internal surface 136. The splined internal surface 136 of the clutch hub 132 may be in meshed engagement with a spline on a stub shaft 139 that is coupled with the wheel 114R. In an embodiment, as illustrated in FIGS. 2 and 4, the clutch hub 132 may be formed unitary and integral with the stub shaft 139. The clutch hub 132 may also comprise a radially extending wall portion 138 coupled with the inboard end of the center portion 134. In certain embodiments, the wall portion 138 may be formed unitary with the center portion 134. An axially extending cylindrical portion 140 may be coupled at its inboard end with a radially outer surface of the wall portion 138. In an embodiment, the cylindrical portion 140 may be formed unitary with the wall portion 138. An outer surface of the cylindrical portion 140 comprises a plurality of axially extending splines 142.

The cylindrical portion 140 of the clutch hub 132 is disposed concentric and coaxial with the wall portion 138 and the center portion 134. As illustrated in FIGS. 2-4, in an embodiment, the clutch hub 132 may be located at least partially concentric with and radially inside the clutch drum 144.

The clutch drum 144 may be disposed about and coupled with an axle half shaft 137 for rotation relative thereto. The clutch drum 144 may comprise an axially extending center portion 145 including a cylindrical interior surface having a clearance fit about a portion of the axle half shaft 137. In an embodiment, not depicted, a bushing may be disposed between the center portion 145 of the clutch drum 144 and the axle half shaft 137. In another embodiment, the axle half shaft 137 may comprise an integral bushing portion that has been machined and/or heat treated to provide a surface for rotation relative to the clutch drum 144.

The clutch drum 144 may further comprise a radially extending discoid wall portion 146. The wall portion 146 may be coupled with, and may be unitary with, the center portion 145. The clutch drum 144 may additionally comprise an axially extending cylindrical portion 147. The cylindrical portion 147 may be coupled with, and may be unitary with, the wall portion 146. The cyclindrical portion 147 is disposed radially about, and comprises a portion of, both the first and second wet clutch assemblies 130, 230. A plurality of axially extending splines 148 may be formed on an internal surface of the cylindrical portion 147.

A first set of clutch plates 150, more clearly shown in FIG. 3, may be disposed in splined engagement with the splines 142 of clutch hub 132 for selective axial movement thereon. The first set of clutch plates 150 may include a plurality of splines or teeth on a radially internal surface thereof for engagement with the splines 142. The first set of clutch plates 150 extend radially outward from the clutch hub 132.

A second set of clutch plates 152 may be disposed in splined engagement with the splines 148 of the cylindrical portion 147 of the clutch drum 144 for selective axial movement therein. The second set of clutch plates 152 may include a plurality of splines or teeth on a radially external surface thereof for engagement with the splines 148. The second set of clutch plates 152 extends radially inward from the cylindrical portion 147 of the clutch drum 144. The individual plates from the second set of clutch plates 152 are interleaved with the individual plates from the first set of clutch plates 150. The first and second set of clutch plates 150, 152 comprise a clutch pack.

The first set of clutch plates 150 can be selectively frictionally engaged with the second set of clutch plates 152 when the plates 150, 152 are compressed together. The axial compression of the plates 150, 152 may be facilitated via a linear actuator 154 (shown in FIGS. 3 and 4). In an embodiment, as illustrated in FIG. 3, the linear actuator 154 may be a ball and ramp type actuator driven by an electric motor (not depicted). In other embodiments, not depicted, the linear actuator 154 may comprise a hydraulic driven piston or an electromagnetic actuator. The linear actuator 154 may comprise a thrust plate 156 having a plurality of axially extending cylindrical protrusions 158.

In an embodiment, as illustrated in FIG. 3, a sleeve 160 may be coupled with the cylindrical portion 134 of the clutch hub 132. A bearing retainer plate 162 may be at least partially concentrically disposed about and coupled with the stub shaft 139 shown in FIGS. 2 and 4. In an embodiment, as illustrated in FIG. 3, the bearing retainer plate 162 may be coupled with the sleeve 160. The bearing retainer plate 162 is disposed axially adjacent to the clutch hub 132. In an embodiment, as illustrated in FIG. 4, a bushing 304 may be disposed about the stub shaft 139 axially between the bearing retainer plate 162 and the clutch hub 132. In an embodiment, the bearing retainer plate 162 may define a recess 306 in which the bushing 304 is at least partially disposed. In an embodiment, the bushing 304 may be a thrust bearing.

In the embodiment shown in FIG. 3, the bearing retainer plate 162 may comprise discoid portion 164 radially extending from an inboard end of a cylindrical neck 166. The discoid portion 164 may define a first plurality of apertures (not depicted) extending axially therethrough. The cylindrical protrusions 158 of the thrust plate 156 may be disposed through the first plurality of apertures in the bearing retainer plate 162 and abut a first pressure plate 168A. The first pressure plate 168A is selectively moved in an axial direction by the linear actuator 154 to frictionally engage the clutch pack 150, 152 between the first pressure plate 168A and a second pressure plate 168B.

A tapered roller bearing 170 may be coupled with the cylindrical neck 166 of the bearing retainer plate 162 to position and rotatably support the clutch hub 132 within the drive unit assembly 120. As illustrated in FIG. 3, one of a pair of fluid distribution apparatuses 172 may be disposed at least partially about a radially outer surface 174 of an outer race of the tapered roller bearing 170. As illustrated in FIGS. 3 and 6-9, in an embodiment, the fluid distribution apparatus 172 may comprise a main body 176. The main body 176 may have a generally hollow cylindrical geometry defined by a radially inner surface 178 and a radially outer surface 180. In certain embodiments, the radially inner surface 178 of the main body 176 is disposed on the outer surface 174 of the tapered roller bearing 170 via a clearance fit such that the fluid distribution apparatus 172 may rotate freely about the tapered roller bearing 170.

The fluid distribution apparatus 172 also comprises a retaining portion 182 coupled with the main body 176 via a conical neck portion 184. In an embodiment, the angle between the conical neck portion 184 and the axis of rotation of the fluid distribution apparatus 172 may be a function of the geometry of the tapered roller bearing 170 and the geometry of the bearing retainer plate 162 (or the clutch drum 144 as discussed intra). The retaining portion 182 may comprise a generally annular discoid geometry defining a radially inner surface 185. In assembly, as illustrated in FIGS. 2-5, an inboard surface 186 of the retaining portion 182 abuts an outboard surface 188 of the discoid portion 164 of the bearing retainer plate 162.

The fluid distribution apparatus 172 further comprises a plurality of tubes 190 coupled with the inboard surface 186 of the retaining portion 182. In an embodiment, the tubes 190 may be disposed circumferentially equidistant about the retaining portion 182. The tubes 190 shown have a hollow-cylindrical geometry defining a radially inner surface 192 and a radially outer surface 194. In an embodiment 3 shown in FIGS. 6-9, a portion of the radially inner surface 192 of the tubes 190 may be substantially continuous (i.e. flush) with the radially inner surface 185 of the retaining portion 182. As illustrated in FIG. 3, the tubes 190 are disposed through apertures 196 in the discoid portion 164 of the bearing retainer plate 162. Accordingly, the tubes 190 are fixed for rotation with the bearing retainer plate 162. In addition, each of the tubes 190 may include a locking element 198 coupled with the radially outer surface 194. The locking elements 198 engage an inboard surface 200 of the discoid portion 164 of the bearing retainer plate 162 to prevent the tubes 190 of the fluid distribution apparatus 172 from moving outboard during operation. The radially inner surface 192 of the tubes 190 define fluid conduits 201.

Figure 5:
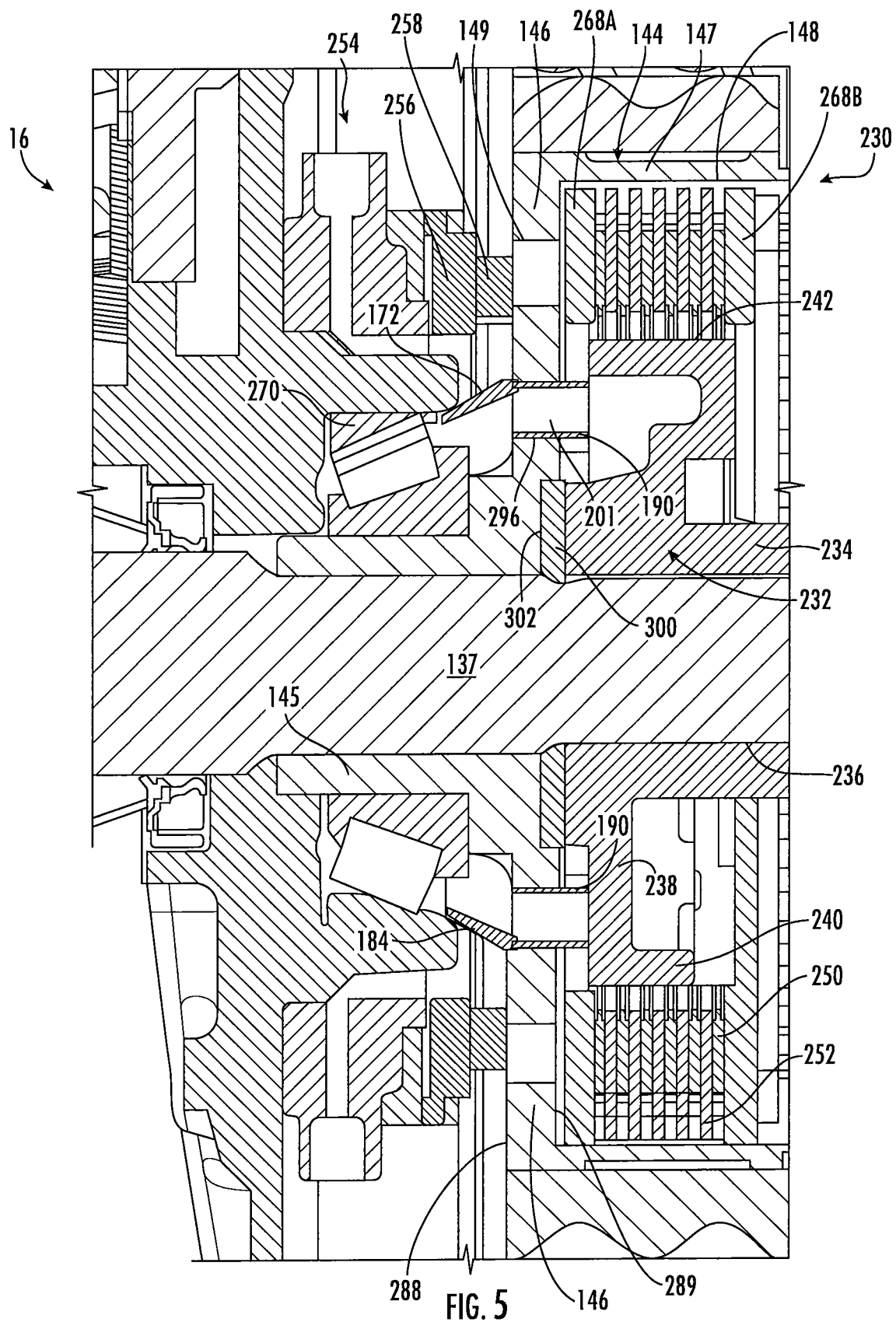
FIG. 5 is an enlarged fragmentary sectional view of a portion of the axle assembly of FIG. 2.
Figure 8:
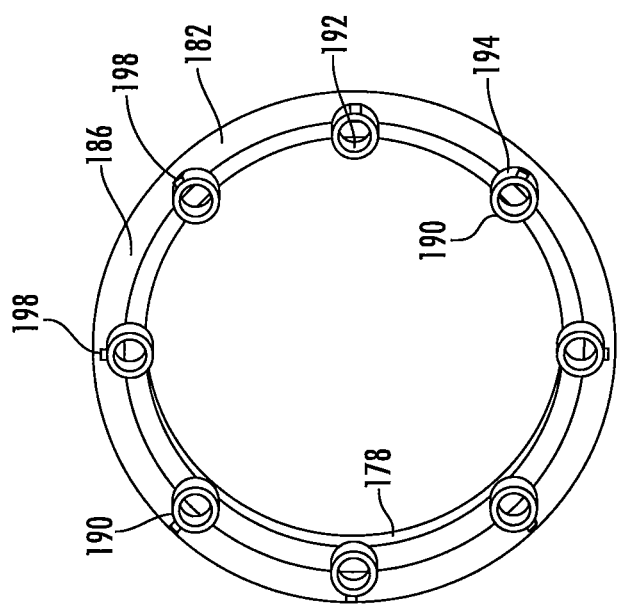
FIG. 8 is a perspective view of the fluid distribution apparatus of the axle assembly of FIG. 2.
Figure 7:
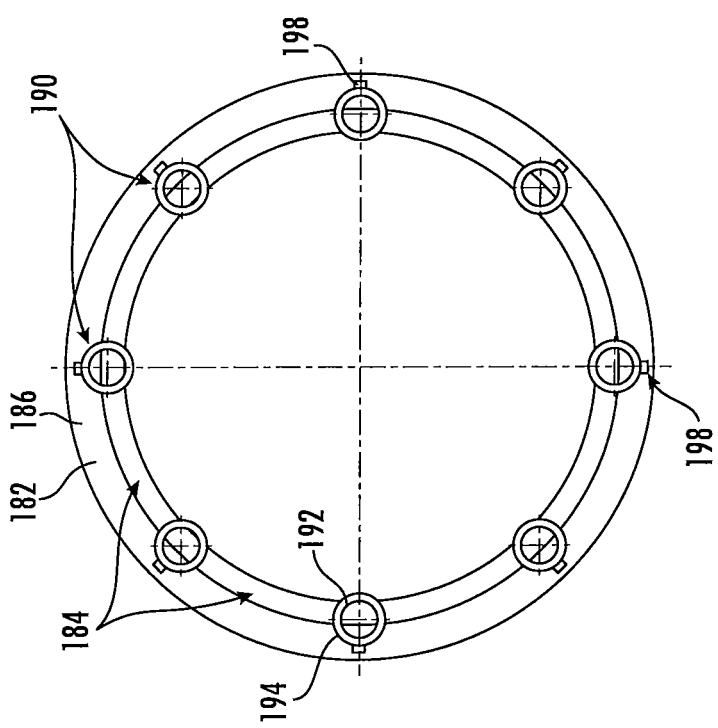
FIG. 7 is a front elevational view of the fluid distribution apparatus of the axle assembly of FIG. 2.
Figure 6:
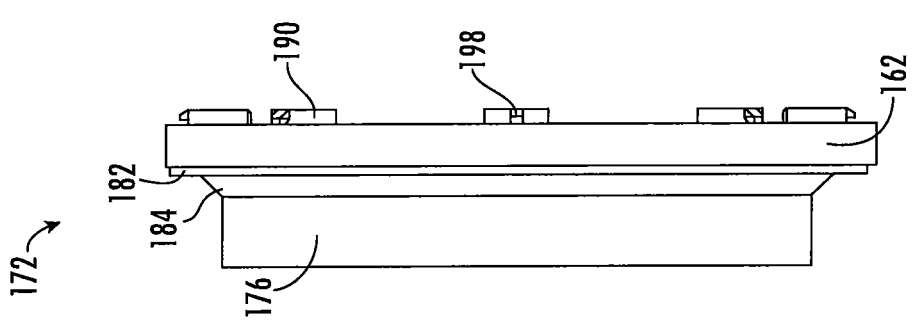
FIG. 6 is a side elevational view of the fluid distribution apparatus of the axle assembly of FIG. 2.
Figure 9:
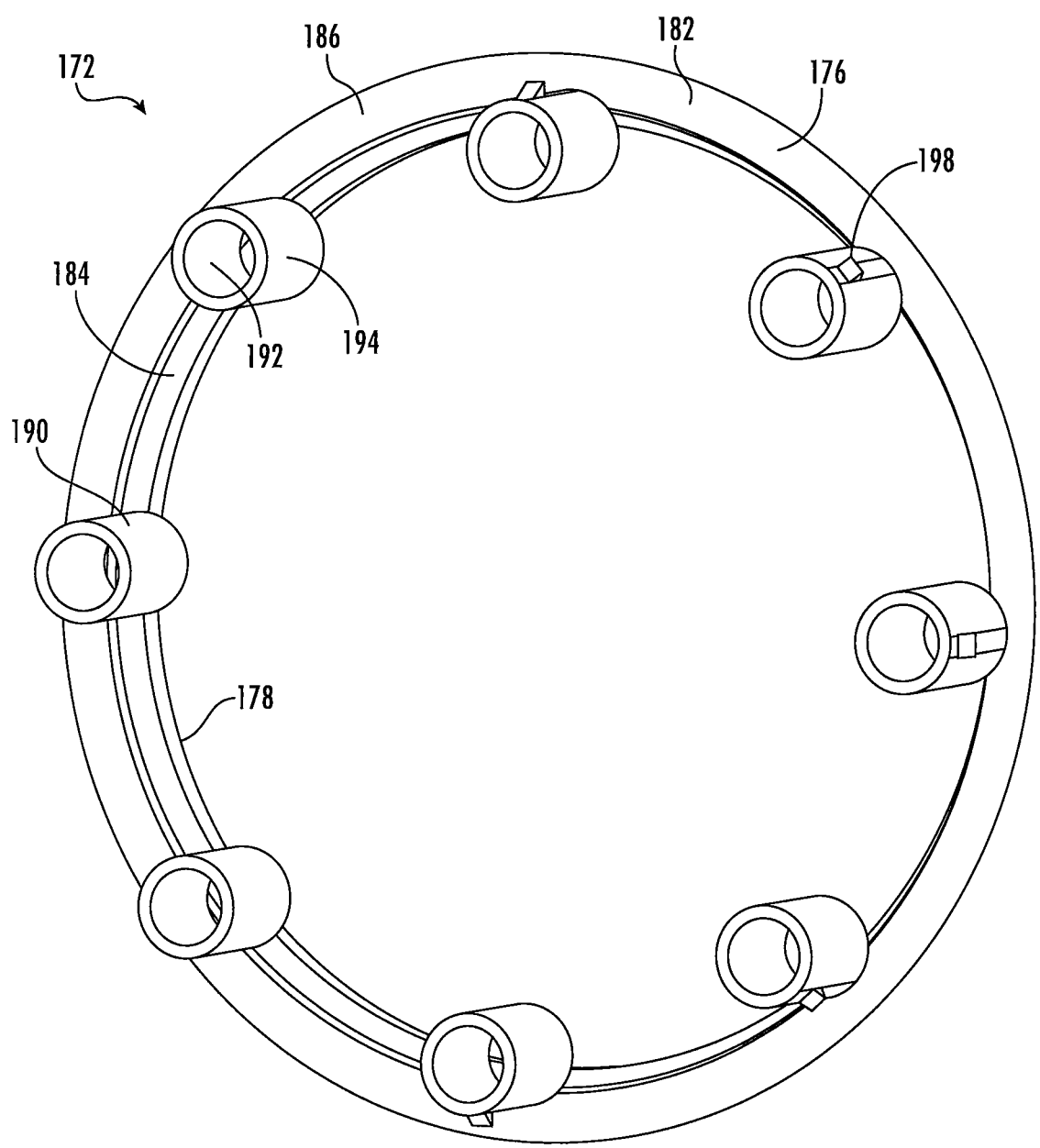
FIG. 9 is a perspective view of the fluid distribution apparatus of the axle assembly of FIG. 2.

In an embodiment, as illustrated in FIGS. 2, 4, and 5, the second wet clutch assembly 230 may comprise a clutch hub 232. As illustrated in FIG. 5, the clutch hub 232 may comprise an axially extending generally cylindrical center portion 234 having a splined internal surface 236. The splined internal surface 236 of the clutch hub 232 may be in meshed engagement with a spline on the axle half shaft 137 that is coupled with the wheel 114L. The clutch hub 232 may also comprise a radially extending wall portion 238 coupled with the inboard end of the center portion 234. In certain embodiments, the wall portion 238 may be formed unitary with the center portion 234. An axially extending cylindrical portion 240 may be coupled at its inboard end with a radially outer surface of the wall portion 238. In an embodiment, the cylindrical portion 240 may be formed unitary with the wall portion 238. An outer surface of the cylindrical portion 240 comprises a plurality of axially extending splines 242.

In an embodiment, as illustrated in FIG. 4, the center portion 234 of the clutch hub 232 may define a recess 308. A portion of the inboard end of the stub shaft 139 may be at least partially disposed within the recess 308. A bushing 310 may be disposed radially between the inboard end of the stub shaft 139 and the center portion 234 of the clutch hub 232. In an embodiment, the bushing 310 may be a needle bearing.

The cylindrical portion 240 of the clutch hub 232 is disposed coaxial with the wall portion 238 and the center portion 234. As illustrated in FIGS. 2-4, in an embodiment, the clutch hub 232 may be located at least partially concentric with and radially inside the clutch drum 144.

The clutch drum 144 may be disposed about and coupled with an axle half shaft 137 for rotation relative thereto. A bushing 300 may be disposed about the axle half shaft 137 axially between the wall portion 146 of the clutch drum 144 and the clutch hub 232. In an embodiment, as illustrated in FIG. 5, the wall portion 146 of the clutch drum 144 may define a recess 302 in which the bushing 300 may be at least partially disposed. In an embodiment, the bushing 300 may be a thrust bearing.

A first set of clutch plates 250 may be disposed in splined engagement with the splines 242 of the clutch hub 232 for selective axial movement thereon. The first set of clutch plates 250 may include a plurality of splines or teeth on an radially internal surface thereof for engagement with the splines 242 of the clutch hub 232. The first set of clutch plates 250 extend radially outward from the clutch hub 232.

A second set of clutch plates 252 may be disposed in splined engagement with the splines 148 of the cylindrical portion 147 of the clutch drum 144 for selective axial movement therein. The second set of clutch plates 252 may include a plurality of splines or teeth on a radially external surface thereof for engagement with the splines 148. The second set of clutch plates 252 extends radially inward from the cylindrical portion 147 of the clutch drum 144. The individual plates from the second set of clutch plates 252 are interleaved with the individual plates from the first set of clutch plates 250. The first and second set of clutch plates 250, 252 comprise a clutch pack.

The first set of clutch plates 250 can be selectively frictionally engaged with the second set of clutch plates 252 when the plates 250, 252 are compressed together. The axial compression of the plates 250, 252 may be facilitated via a linear actuator 254 (more clearly shown in FIG. 5). In an embodiment, the linear actuator 254 may be a ball and ramp type actuator driven by an electric motor (not depicted). In other embodiments, not depicted, the linear actuator 254 may comprise a hydraulic driven piston or an electromagnetic actuator. The linear actuator 254 may comprise a thrust plate 256 having a plurality of axially extending cylindrical protrusions 258.

The discoid wall portion 146 of the clutch drum 144 may define a first plurality of apertures 149 extending axially therethrough. The cylindrical protrusions 258 of the thrust plate 256 may be disposed through the first plurality of apertures 149 in the discoid wall portion 146 and abut a first pressure plate 268A. The first pressure plate 268A is selectively moved in an axial direction by the linear actuator 254 to frictionally engage the clutch pack 250, 252 between the first pressure plate 268A and a second pressure plate 268B.

A tapered roller bearing 270 may be coupled with the center portion 145 of the clutch drum 144 to position and at least partially rotatably support the clutch drum 144 within the housing of the second axle assembly 16. As illustrated in FIG. 5, another one of the fluid distribution apparatuses 172 may be disposed at least partially about a radially outer surface of an outer race of the tapered roller bearing 270. In assembly shown in FIG. 5, the inboard surface 186 of the retaining portion 182 of the fluid distribution apparatus 172 abuts an outboard surface 288 of the wall portion 146 of the clutch drum 144. The tubes 190 of the fluid distribution apparatus 172 are disposed through apertures 296 formed in the wall portion 146 of the clutch drum 144. Because the tubes 190 are disposed through the apertures 296, the fluid distribution apparatus 172 is fixed for rotation with the clutch drum 144. In addition, the locking element 198 of the tubes 190 engage an inboard surface 289 of the wall portion 146 of the clutch drum 144 to prevent the tubes 190 from moving outboard during operation.

During operation of the second axle assembly 16, rotation of the outer race of the tapered roller bearings 170, 270 pumps a fluid such as a lubricant, for example, from within the axle housing through the tapered roller bearings 170, 270 into the fluid distribution apparatuses 172. Because the fluid distribution apparatuses 172 are rotating, the fluid therein experiences a centrifugal force from the rotation. The fluid also experiences a normal force when in contact with the conical neck portion 184 of the fluid distribution apparatuses 172. The combination of the centrifugal force and the normal force acting on the fluid facilitates travel of the fluid through the main body 176 and the conical neck portion 184 of the fluid distribution apparatuses 172 to the retaining plate 182. A portion of the axial travel of the fluid is halted by the retaining portion 182 of the fluid distribution apparatuses 172. Another portion of the fluid travels into the tubes 190 of the fluid distribution apparatuses 172. The fluid passes through the fluid conduits 201 of the fluid distribution apparatuses 172 to the clutch plates 150, 152 of the first wet clutch assembly 130 and to the clutch plates 250, 252 of the second wet clutch assembly 230.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
    a clutch drum including a center portion, a wall portion coupled to the center portion, and a cylindrical portion coupled to the wall portion, wherein a plurality of first apertures is formed in the clutch drum;
    a first clutch hub at least partially disposed within the clutch drum about a first shaft;
    a second clutch hub at least partially disposed within the clutch drum about a second shaft;
    a first bearing disposed adjacent the first clutch hub about the first shaft;
    a second bearing disposed adjacent the second clutch hub about the second shaft;
    a bearing retainer plate disposed adjacent at least one of the first bearing and the first clutch hub, wherein a plurality of second apertures is formed in the bearing retainer plate;
    a first clutch pack at least partially disposed between the first clutch hub and the clutch drum;
    a second clutch pack at least partially disposed between the second clutch hub and the clutch drum; and
    a rotatable first fluid distribution apparatus disposed between one of the bearings and one of the clutch packs, wherein the first fluid distribution apparatus is configured to permit fluid communication between the one of the bearings and the one of the clutch packs.

2. The axle assembly of claim 1, further comprising a second fluid distribution apparatus disposed between another one of the bearings and another one of the clutch packs, wherein the second fluid distribution apparatus is configured to permit fluid communication between the another one of the bearings and the another one of the clutch packs.

3. The axe assembly of claim 2, wherein the second fluid distribution apparatus is rotatable.

4. The axle assembly of claim 2, wherein a portion of at least one of the first fluid distribution apparatus and the second fluid distribution apparatus extends through the apertures formed in the at least one of the clutch drum and the bearing retainer plate.

5. The axle assembly of claim 1, wherein the first fluid distribution apparatus includes:
 a main body;
 a conical neck portion coupled with the main body; and
 a retaining portion coupled with the conical neck portion, wherein the retaining portion includes at least one tube coupled thereto, the at least one tube configured to receive a fluid therethrough.

6. The axle assembly of claim 5, wherein the main body of the first fluid distribution apparatus circumferentially surrounds a bearing.

7. The axle assembly of claim 5, wherein a portion of an inner surface of the at least one tube is continuous with an inner surface of the retaining portion.

8. The axle assembly of claim 5, wherein the retaining portion includes a plurality of the tubes disposed circumferentially equidistant around the retaining portion.

9. The axle assembly of claim 5, wherein the at least one tube is at least partially disposed through a rotating component of a clutch.

10. The axle assembly of claim 9, wherein the at least one tube includes a locking element disposed thereon.

11. The axle assembly of claim 10, wherein the locking element abuts a first surface of the rotating component of the clutch.

12. The axle assembly of claim 11, wherein a surface of the retaining portion abuts a second surface of the rotating component of the clutch opposite the first surface thereof.

* * * * *